United States Patent [19]

Duncan

[11] 4,047,319
[45] Sept. 13, 1977

[54] FISHING DEVICE

[75] Inventor: William Palmer Duncan, Jersey City, N.J.

[73] Assignee: Van Buren Cunningham, II, Harker Heights, Tex. ; a part interest

[21] Appl. No.: 704,526

[22] Filed: July 12, 1976

[51] Int. Cl.² ............................................. A01K 93/00
[52] U.S. Cl. .................................. 43/44.87; 43/44.91
[58] Field of Search ................... 43/44.87, 44.88, 44.91

[56] References Cited

U.S. PATENT DOCUMENTS

| 2,208,240 | 7/1940 | Arnesen et al. | 43/44.88 |
| 2,965,999 | 12/1960 | Marsh | 43/44.87 |
| 3,353,294 | 11/1967 | Mundorff et al. | 43/44.91 |
| 3,381,407 | 5/1968 | McDougall | 43/44.91 |
| 3,672,087 | 6/1972 | Milburn, Jr. | 43/44.88 |

Primary Examiner—Louis G. Mancene
Assistant Examiner—Daniel J. Leach
Attorney, Agent, or Firm—Jack Matalan

[57] ABSTRACT

A fishing device for locating the depth of a body of water and for adjusting a hook on a fishing line to be set at any desired height relative to the bed of the body of water. The device comprises a float containing a tubular assembly. The assembly contains two frictional means: one permits the line to move only towards the bed of the body of water and the second restricts movement of the line in both directions. A disengagement means, when actuated, permits free movement of the line in both directions.

7 Claims, 6 Drawing Figures

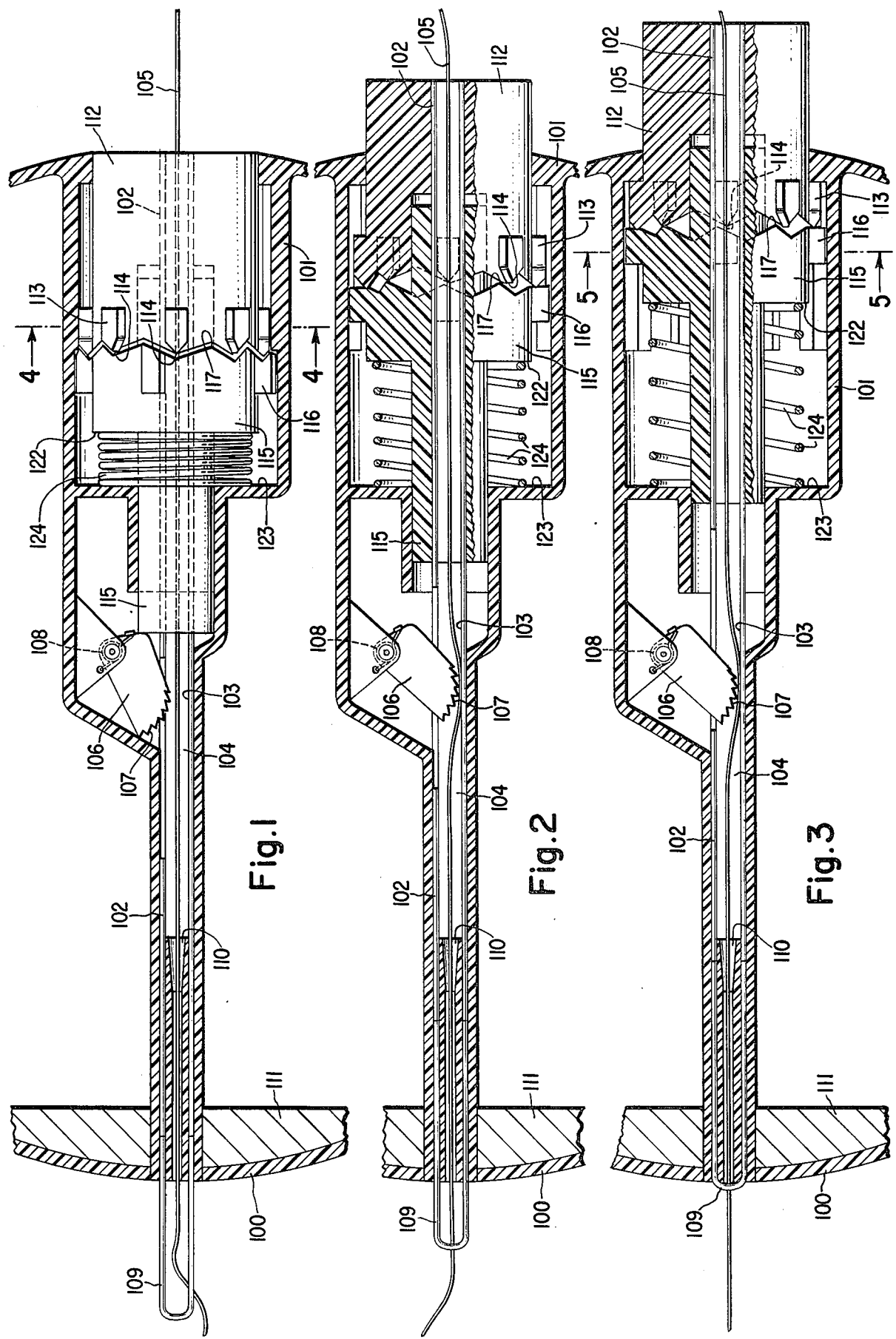

FISHING DEVICE

BACKGROUND OF THE INVENTION

Devices exist in the prior art for locating the depth of a bed of a body of water and for setting the hook at any preferred distance above such bed, e.g. see U.S. Pat. Nos. 2,208,240; 2,984,040; 3,057,107 and 3,381,407. However, such devices suffer from numerous disadvantages such as complexity and number of internal parts, parts which readily deteriorate, failure of mechanisms contained therein to positively lock the line in a desired position, difficulty in threading the line through the device, etc.

The present invention overcomes all of the disadvantages associated with the prior art devices. Indeed, the present device utilizes, as the disengagement means (to be described in detail below) the mechanism associated with the common ball point pen. That is, in the ball point pen, when the top plunger is held down (by finger pressure), the pen tip is fully extended; this is referred to as position "A", which is analogous to that described in detail in FIG. 1. below.

When pressure is released on the plunger, the pen tip is retracted slightly into the writing position; this is referred to as position "B", which is analogous to that described in detail in FIG. 2 below. Of course, the pen tip could be in a fully retracted position upon release of the plunger if the position prior to depression of the plunger was position B.

When the plunger is again fully depressed, position A is present and when pressure on the plunger is released the pen tip will be fully retracted in the pen barrel — this is referred to as position "C", which is analogous to that described in detail in FIG. 3 below.

Thus the action of the common ball point pen is position A — position B — position A — position C — position A - - - etc. Analogously, the device of this present invention will undergo the actions: FIG. 1 — FIG. 2 — FIG. 1 — FIG. 3 — FIG. 1 - - - etc.

The disengagement means may be any mechanism which is known in the art as being useful for protraction and retraction, especially protraction-retraction mechanisms for tubular members such as ball point pens. Such disengagement means are conventional and do not form part of this invention. However, the protraction-retraction mechanism described in U.S. Pat. No. 2,905,147 issued Sept. 22, 1959 to Frank T. Johmann and entitled "Protraction-Retraction Mechanism For Writing Instruments" is especially useful for this invention and is herein incorporated by reference.

DETAILS OF THE PRESENT INVENTION

The present invention represents an improved device for locating the depth of a body of water and for permitting at least one fish hook affixed to a fishing line to be set at any desired height relative to the bed of said body of water. The improvement comprises:

A. a float; and

B. a tubular assembly carried by said float, said assembly including:

1. a passageway extending throughout the length of the assembly adapted to permit insertion of the line at a top of the passageway and emergence of the line at a bottom of the passageway; and 2. a first frictional means adapted to permit a first frictional engagement of said line at a point intermediate the top and the bottom of the passageway, in a manner so as to restrict movement of the line towards the top of the passageway, but not to restrict movement of the line towards the bottom of the passageway when said first frictional means is engaged; and 3. a second frictional means adapted to permit a second frictional engagement of said line at a point proximate to the bottom of said passageway, in a manner so as to restrict all movement of the line when said second frictional means is engaged; and 4. disengagement means for disengaging the first and second frictional means, such that when the disengagement means has been actuated, said line is capable of being moved freely toward the top or the bottom of the passageway and when said disengagement means has not been actuated, said first frictional means is engaged alone, or in combination with engagement of said second frictional means.

Details of the present invention may be more readily understood with reference to the drawings in which:

FIGS. 1, 2 and 3 are vertical cross-sectional views of the device.

Figure 4:
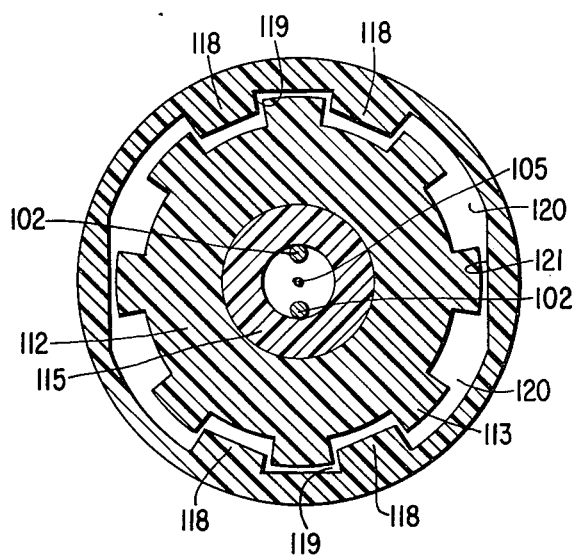
FIG. 4 is a horizontal cross-sectional view taken along lines 4—4 of FIG. 1.

Referring to FIGS. 1, 2 and 3 in which like numbers refer to like features:

Float body 100 carries within it tubular assembly 101. Tubular assembly 101 in turn carries within it a pair of rod members 102 which extends throughout the entire length of assembly 101. The inner surface 103 of rod members 102 defines central passageway 104 which extends throughout the entire length of members 102. Passageway 104 is of sufficient diameter to permit fishing line 105 to pass freely therethrough. Assembly 101 contains ratchet means 106 (the "first frictional means") having teeth 107 and spring means 108 of sufficient strength to normally (i.e. when ratchet means 106 is not disengaged) urge teeth 107 against line 105 which in turn is pressed against surface 103 in a manner so as to restrict upward movement of line 105 (i.e. movement towards the fisherman), but nevertheless to permit free movement of line 105 in a downward direction.

Affixed to the lower portion of member 102 is a U-shaped wire means 109, i.e. the "second frictional means" which, when engaged, is retracted upward (i.e. towards the fisherman) such that the base of the U frictionally engages line 105 against the bottom of float body 100 in a manner such that movememt of line 105 through passageway 104 is restricted in both an upward and a downward direction.

Intermediate between ratchet means 106 and U-shaped wire means 109 the member 102 preferentially contains an inverted forcing cone 110. Cone 110 serves a dual function: it serves to permit easier threading of line 105 through passageway 104 and it serves to reduce the diameter of passageway 104 below cone 110 such that at the opening of passageway 104 at the base of float body 100 there will be little or no axial play of line 105, thereby insuring a more perfect frictional engagement of wire means 109 (when it is engaged) to press line 105 against the bottom of float body 100. The base of float body 100 preferentially contains ballast means 111 (e.g. a lead plate) to stabilize the float body 100 on the surface of the water.

The disengagement means is responsible for carrying out three functions:

a. when the disengagement means is actuated (and is maintained in an actuated mode by sufficient finger pressure), ratchet means 106 as well as wire member means 109 are disengaged and line 105 is free to move upward or downward through passageway 104; FIG. 1 shows the disengagement means in an actuated mode (this mode is used when it is desired to thread line 105 through passageway 104 and is also used to switch the mode associated with FIG. 2 to the mode associated with FIG. 3, or vice versa, as described hereinbelow).

b. when the disengagement means is not actuated (i.e. by releasing finger pressure) ratchet means 106 is permitted to be engaged, thereby restricting upward movement of line 105 through passageway 104. This is the mode shown in FIG. 2 (an assumption is made that the mode of FIG. 2 follows that of FIG. 1; however, the mode of FIG. 3 could follow that of FIG. 1).

c. assuming that the mode of FIG. 2 followed that of FIG. 1, the disengagement means is a gain actuated, thus resulting in the mode of FIG. 1 and upon release of the finger pressure, the mode of FIG. 3 results. In the mode of FIG. 3, not only is ratchet means 106 engaged, but wire member means 109 is engaged, thereby restricting both upward and downward movement of line 105 through passageway 104.

The disengagement means shown in FIGS. 1-5 is substantially identical to that described in U.S. Pat. No. 2,905,147, previously mentioned hereinabove. It consists of tubular latch element 112, and unless actuated by continuous sufficient finger pressure (in which case element 112 would be depressed such that it is substantially flush with the top of float body 100, as shown in FIG. 1) normally projects outward through open upper end of float body 100, as shown in FIGS. 2 and 3. A series of spaced ears 113 extend outwardly from the bottom portion of the element 112 and a series of downwardly extending teeth 114 are defined by the bottom edge of element 112 and ears 113.

The other major part of the disengagement means consists of a tubular latch element 115 containing a series of radially spaced ears 116 which extend outwardly from the upper portion of element 115; the upper edges of ears 116 are tapered so as to form the upwardly projecting teeth 117 (which are capable of mating with teeth 114). The upper portion of element 115 extends into the lower portion tubular latch actuating element 112.

In the interior surface of the wall of assembly 101 is formed a latch receiving means including a series of radially spaced inwardly deep projecting lugs 118 and a series of longitudinally extending shallow recesses or slots 119 defined between said lugs 118. Between the lugs 118 there are also formed inner longitudinally extending deep recesses or slots 120 formed by a series of radially spaced inwardly shallow projecting lugs 121. The ears 113 are longitudinally movable within the shallow slots 119 but cannot rotate because they are at all times maintained within the slots 119.

Element 115 is of sufficient length such that when it is fully depressed (as in FIG. 1) it is in contact with ratchet means 106 with sufficient force to prevent ratchet means 106 from engaging line 105 against inner surface 103. Intermediate of top and bottom of element 115, element 115 contains a shoulder 122 and the portion of element 115 extending below shoulder 122 is preferably of smaller diameter. Assembly 101 contains a shelf or flange 123; located between shoulder 122 and flange 123 is a heavy compression coil spring 124. Spring 124 is of such compression such that unless sufficient finger pressure is maintained on element 112 forcing said element to be fully depressed (and thus element 115 to be fully depressed with resultant contact with and disengagement of ratchet means 106), it will normally urge element 115 upward away from contact with ratchet means 106 (thus in FIGS. 2 and 3, ratchet means will always be engaged).

As more fully described in said U.S. Pat. No. 2,905,147, when element 112 is fully depressed, it is in an unstable position. That is, ears 116 on element 115 will be depressed below lugs 118 and 121 and thus element 115 will be free to rotate (element 112 is never free to rotate). When finger pressure from element 112 is released, the compression of spring 124 coupled with the rotatability of element 115 (whose ears 116 are only in an unstable point-to-point contact with ears 113 on element 112) will cause element 115 to move upwardly into the mode shown in FIG. 2 and FIG. 3. Upon fully depressing element 112 and then release of the finger pressure, element 115 will again rotate into the mode shown in FIG. 3 or FIG. 2.

Figure 5:
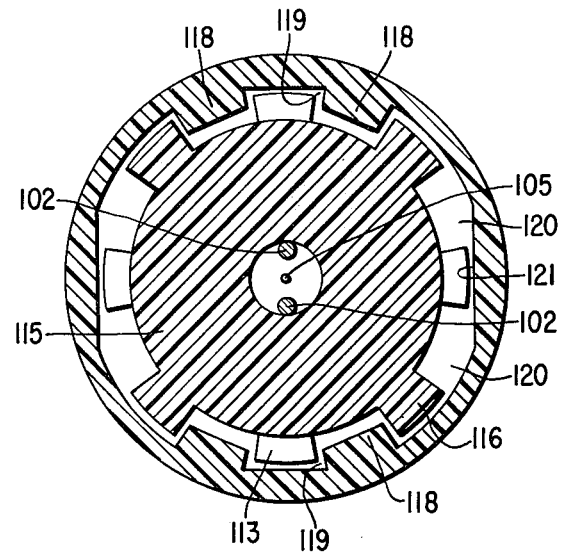
FIG. 5 is a horizontal cross-sectional view taken along lines 5—5 of FIG. 3.

In FIG. 5, the mode of ears 116 corresponds to that of FIG. 3. If the ears 116 were locked into slots 119, the mode of FIG. 2 would be present. In any event, element 115 is capable of rotation, only after it is fully depressed, i.e. sufficient for the tops of ears 116 to clear the undersides of lugs 118 and 121. When ears 116 are within deep slots 120, element 115 is free to rise to its maximum height, thus forcing element 112 up to its maximum height (and thus causing U-shaped wire means 109 to engage line 105 against the body of float 100, thereby preventing movement of line 105 in either an upward or downward direction). However, when ears 116 rotate into shallow slots 119, two of the ears 116 are restrained against the underside of lugs 121 and the device is thus constrained into the mode of FIG. 2 (rather than FIG. 3) in which case only the ratchet means 106 (rather than both ratchet means 106 and wire means 109) is engaged.

Figure 6:
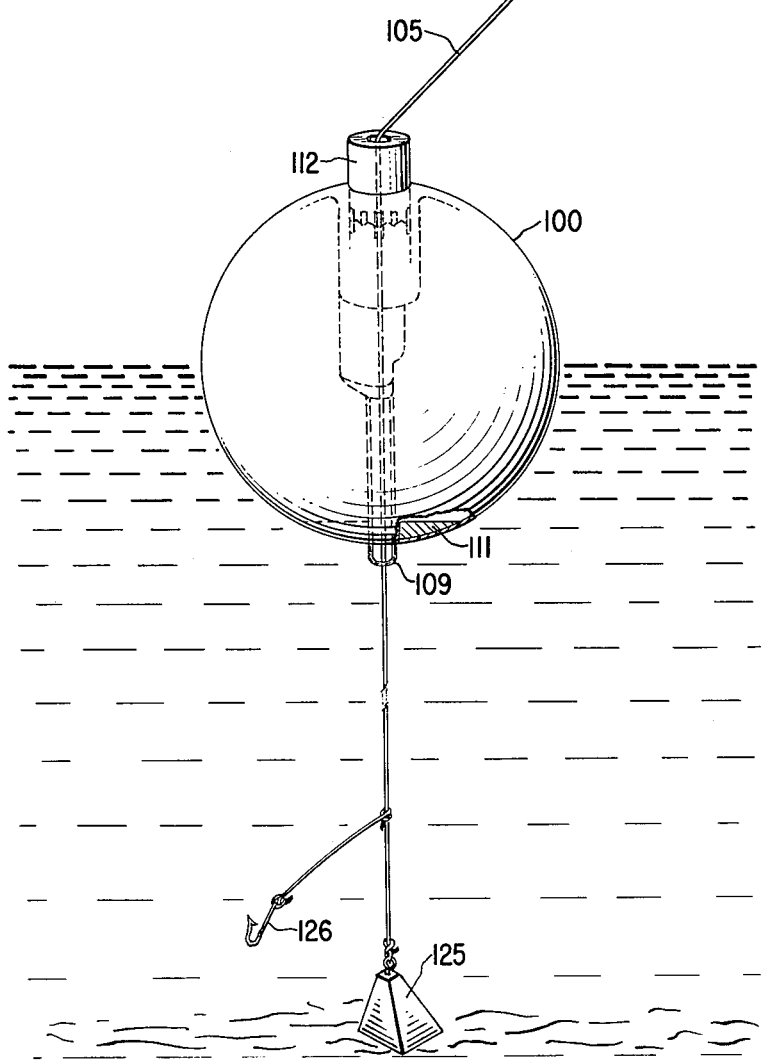
FIG. 6 is a perspective view of the device when it is in the mode associated with FIG. 2.

In FIG. 6, float body 100 is shown on the water's surface with the device being in the mode of FIG. 2. At the bottom of line 105 is shown a suitable sinker 125 and a hook 126 (which are of course affixed after line 105 has been threaded through passageway 104).

To use the device of the present invention, several feet of line 105 are pulled from an appropriate fishing reel. Element 112 is then fully depressed with finger pressure and the free end of line 105 is fed through passageway 104 until the free end of the line emerges from the bottom of float body 100.

Finger pressure on element 112 is then released and the device will then be present in the mode of FIG. 2 or FIG. 3. If the device is not in the mode of FIG. 2, element 112 is again fully depressed (placing the device again in the mode of FIG. 1) and finger pressure on element 112 is released. A suitable sinker 125 and hook 126 may then be affixed to the free end of line 105.

The device is then cast out into the body of water; the weight of sinker 125 will pull the free end of line 105 downward through the water until it reaches the water's bed (this will be evident from the slack which will appear in line 105 between float 100 and the fishing reel). The device is then reeled in and the length of line 105 below the device will correspond to the depth of the water. If it is desired to fish at a height above the water's bed, e.g. one foot from the bottom, element 112 is fully depressed, and one foot of line 105 is pulled from the top of float 100. Thereafter, finger pressure on element 100 is released and the device will now be in the mode of FIG. 3 (the line will not be capable of moving upward or downward). The device is then re-cast into the water.

Each time it is desired to fish in a new location, the sequence set forth above (commencing after affixing sinker 125 and hook 126) should be repeated. Of course, when casting the device into the water when it is in the mode of FIG. 2, the line 105 should be permitted to be freely stripped from the fishing reel in order to insure that the line 105 will not be impeded in travelling downward to the water bed. When casting into the water in the mode of FIG. 3, it is only necessary to allow the line 105 to strip freely from the fishing reel until float 100 has impinged on the surface of the water.

What is claimed is:

1. In a fishing device for locating the depth of a body of water and for permitting at least one fish hook affixed to a fishing line to be set at any desired height relative to the bed of said body of water, the improvement which comprises:
   a. a float; and
   b. a tubular assembly carried by said float, said assembly including:
      1. a passageway extending throughout the length of the assembly adapted to permit insertion of the line at a top of the passageway and emergence of the line at a bottom of the passageway; and
      2. a first frictional means adapted to permit a first frictional engagement of said line at a point intermediate the top and the bottom of the passageway, in a manner so as to restrict movement of the line towards the top of the passageway, but not to restrict movement of the line towards the bottom of the passageway when said first frictional means is engaged; and
      3. a second frictional means adapted to permit a second frictional engagement of said line at a point proximate to the bottom of said passageway, in a manner so as to restrict all movement of the line when said second frictional means is engaged; and
      4. disengagement means for disengaging the first and second frictional means, such that when the disengagement means has been actuated, said line is capable of being moved freely toward the top or the bottom of the passageway and when said disengagement means has not been actuated, said first frictional means is engaged alone, or in combination with engagement of said second frictional means.

2. A device of claim 1 wherein the float includes ballast means to stabilize flotation of the float in said body of water.

3. The device of claim 1 wherein said tubular assembly includes rod members having inner and outer surfaces, said inner surfaces defining said passageway.

4. The device of claim 3 wherein the rod members cooperate with said disengagement means in a manner such that the rod members are freely capable of movement in a direction parallel to a central axis of the rod members but are incapable of movement in any other direction.

5. The device of claim 1 wherein the second frictional means comprises a U-shaped member whose arms are affixed to the rod members at a point intermediate the location of the first frictional means and the bottom of the passageway, said U-shaped member being adapted to fix the line against the body of the float at a point proximate that of the bottom of the passageway when said second frictional means has been engaged.

6. The device of claim 3 wherein said first frictional means comprises ratchet means having a plurality of teeth on a surface thereof together with resilient means normally urging the teeth to fix the line against said inner surface when said disengagement means has not been actuated.

7. The device of claim 1 wherein there is disposed, in a lower portion of the passageway, an inverted forcing cone to facilitate threading of the line through the passageway and which also serves to restrict the diameter of that portion of the passageway extending below the apex of the cone.

* * * * *